Feb. 10, 1942.                H. O. HEM                    2,272,971
                            TESTING DEVICE
                       Filed Aug. 25, 1939            3 Sheets-Sheet 1
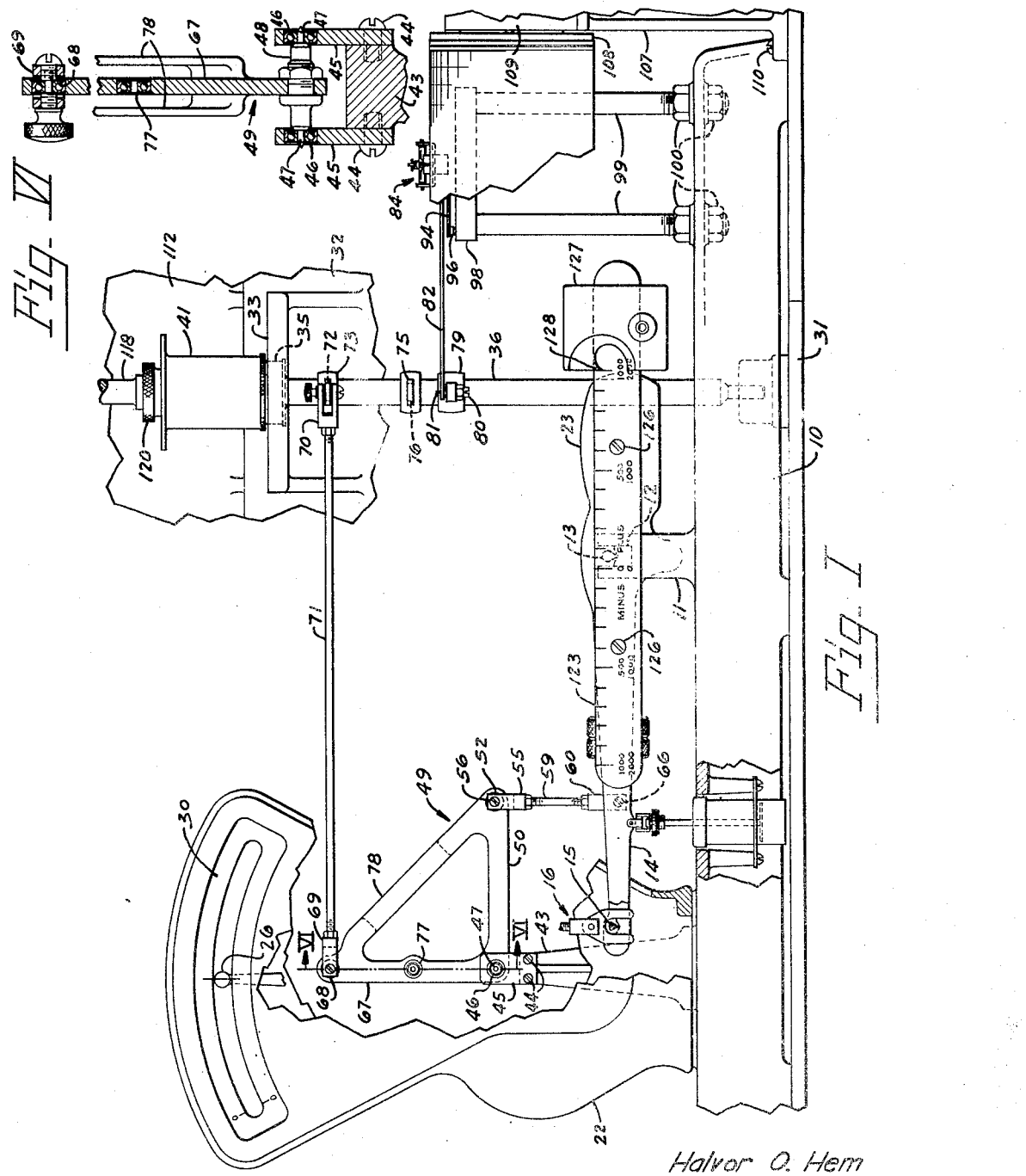
Halvor O. Hem
INVENTOR
BY Marshall & Marshall
ATTORNEYS

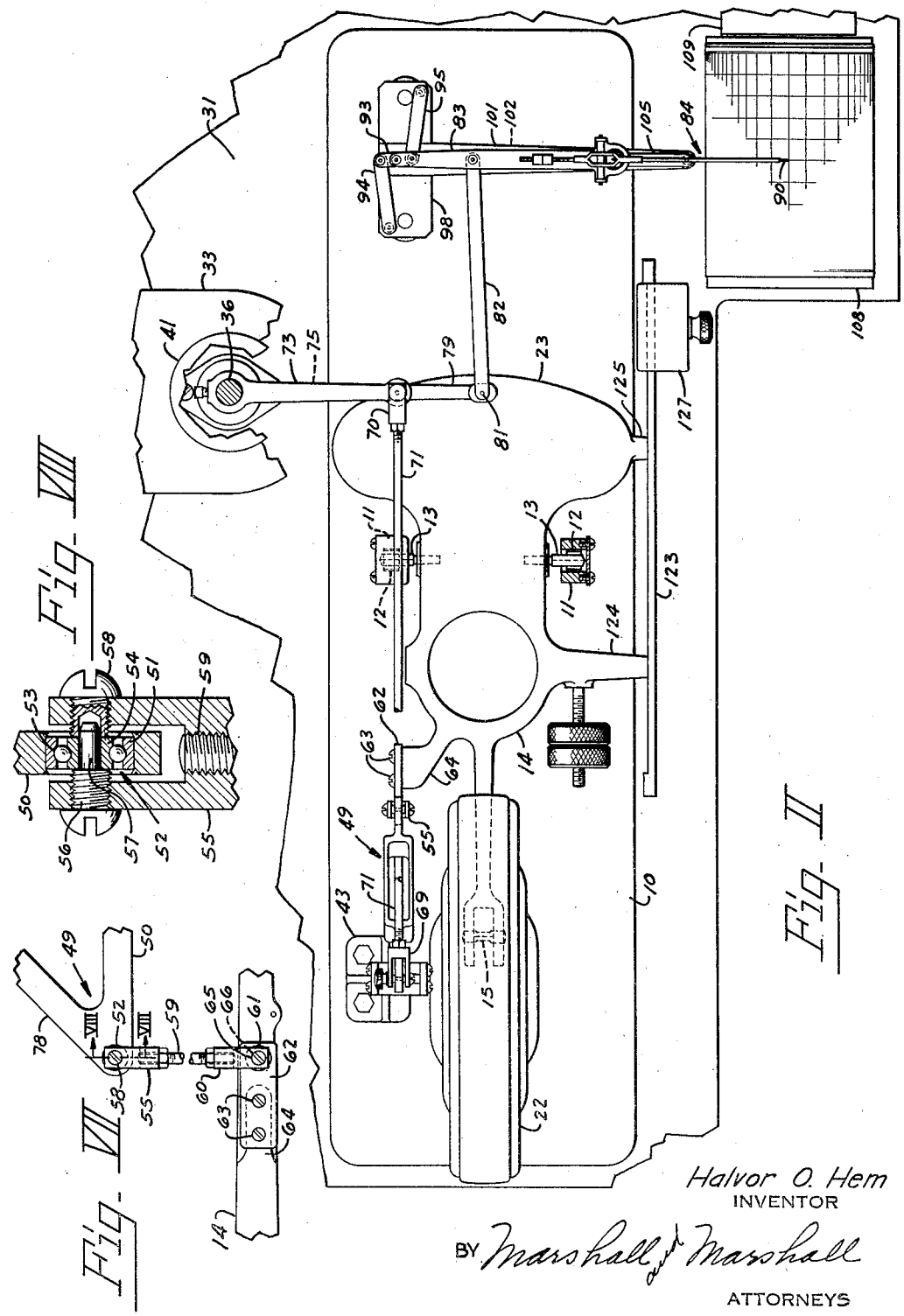

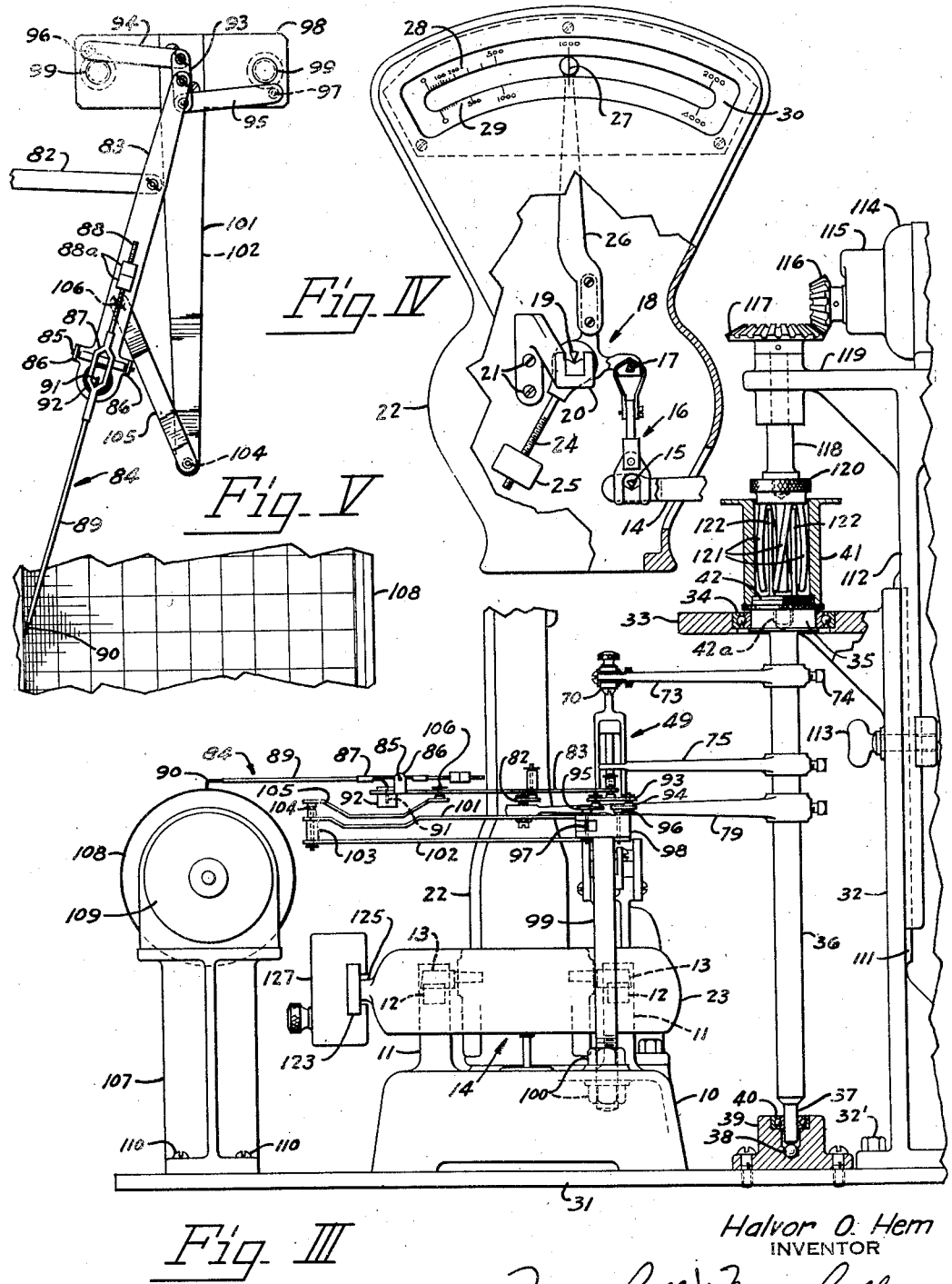

Patented Feb. 10, 1942

2,272,971

UNITED STATES PATENT OFFICE 2,272,971

TESTING DEVICE

Halvor O. Hem, Toledo, Ohio, assignor to Toledo Scale Company, Toledo, Ohio, a corporation of New Jersey Application August 25, 1939, Serial No. 291,828

3 Claims. (Cl. 265—11)

This invention relates generally to testing devices, and more particularly to devices for testing characteristics of flour.

In the progress of bakery methods, especially the mechanization for quantity production, greater demands are made on the flour producers for a flour which has a uniform baking quality. The uniformity of flour before mass production of bakery products was not important because the baking was done in small shops under the charge of a master baker who had the requisite knowledge to adjust the operations to the varying qualities of the flour. Since the beginning of mass production of bakery products baking tests have been the principal method for determining the baking value of flour but it was found that a flour which baked well in a certain bakery, under definite baking methods, would not necessarily bake well in another bakery where other methods were employed.

The chemical determination of certain factors, such as the hydrogen ion concentration, protein, ash, etc., which have come into use through the application of chemical knowledge, are not always in direct correlation with the baking value of flours. A test has been proposed by Chopin—U. S. Patent 1,468,900, in which a membrane made of flour dough is expanded by air in a testing apparatus and the coefficient of distention determined. This method, however, does not determine all of the mechanical factors of the dough.

The object of this invention is the provision of an improved device for determining characteristics of flour dough; and, A further object is the provision of improved means for automatically recording such characteristics.

These, and other objects and advantages will be apparent from the following description in which reference is had to the accompanying drawings, illustrating a preferred embodiment of the invention and wherein similar reference numerals refer to similar parts throughout the several views.

In the drawings:

Fig. I is a front elevational view of a device embodying the invention, portions thereof being broken away to more clearly show the relation of the component parts.

Fig. II is a plan view thereof.

Fig. III is a fragmentary end elevation, parts being broken away and parts sectioned.

Fig. IV is a front elevational view of the torque determining means, a portion of the housing being broken away to expose the counterbalancing pendulum.

Fig. V is an enlarged plan view of the recording means.

Fig. VI is an enlarged sectional view substantially along the line VI—VI of Fig. I of the torque crank.

Fig. VII is an enlarged fragmentary view of the connection between the torque crank and the lever; and, Fig. VIII is an enlarged sectional view of the antifriction bearing substantially along the line VIII—VIII of Fig. VII.

Referring to the drawings in detail:

The device comprises a base 10, preferably a hollow iron casting provided with two upwardly extending posts 11. V bearings 12, fixed in the upper ends of these posts, form supports for pivots 13 extending laterally from a lever 14. The free end of this lever, by means of a pivot 15, engages a stirrup 16 whose upper end is suspended from a pivot 17 in a pendulum 18 which, by means of a pivot 19, is mounted upon suitable bearings in a bracket 20 bolted, by means of screws 21, to the rear wall of a housing 22 which is mounted, in proper position, upon the base 10. The opposite end of the lever 14 is provided with an integral counterbalancing weight 23 which is adapted to be adjusted in weight to counterbalance the dead load of the parts connected thereto. A stem 24 studded into the pendulum body 18 has adjustably seated thereon a weight 25 for the usual purpose. Also secured to the pendulum body is a pointer 26 provided with an index mark 27 adjacent its upper end. This index mark cooperates with two series of indicia 28 and 29 marked on a chart 30 fixedly stationed in the upper end of the housing 22.

Extending upwardly from a steel plate 31, upon which the base 10 is also preferably fastened, is a bracket 32 having a forwardly extending shelf 33 in which a circular aperture is provided forming a seat for an antifriction ball bearing 34. The inner race of this ball bearing forms a support for a cylindrical portion 35 of a vertically extending shaft 36 having a turned-down end 37. This end is mounted upon a bearing ball 38 seated within a counterbore in a bracket 39 fastened to the plate 11. The turned-down portion 37 also extends through an antifriction bearing 40 seated in the upper end of the bracket 39 to prevent any but rotative motion.

For the purpose of mounting a receptacle 41 for reception of the material specimen to be tested, a threaded bottom member 42 is screwed to the upper surface of the cylindrical portion 35 of the shaft 36 by means of an integral stud 42a. The receptacle 41 is then in turn threaded on the threaded bottom member 42. The construction being such that it may be readily disassembled for cleaning.

Mounted in back of the housing 22 on the base 10 (Figures I, II and VI) is an upwardly extending support 43. To the machined sides of the upper end are fastened, by means of screws 44, plates 45 having circular apertures in which ball bearings 46 are staked. These ball bearings form antifriction seats for hardened and ground tenons 47 of a fulcrum member 48 which penetrates and is locked to a torque crank 49. A horizontally extending arm 50 of this crank has ringstaked in its end the outer race 51 of an antifriction ball bearing 52. The usual bearing balls 53 and inner race 54 are assembled within the outer race in the usual manner (Figure VIII). A clevis 55 whose arms straddle the ball bearing 52 have threaded apertures and a screw 56, seated in one of these apertures, is provided with a tenon 57 having a snug fit in the inner race 54. A screw 58 provided with a longitudinally extending hole receives that portion of the tenon 57 which extends through the ball bearing 52. When the screws 56 and 58 are tightened the shoulder on the screw 56 and the end of the screw 58 are adapted to clamp the inner race 54 of the ball bearing in the crank arm so that relative movement between the crank and the clevis must take place on the bearing balls eliminating friction to the greatest extent.

To the lower end of a short connecting rod 59, fixed in the lower end of the clevis 55, is a clevis 60 identical in construction with the clevis 55, pivotally connected to a ball bearing 61 ringstaked in an arm 62. This arm is fastened by means of screws 63 to a boss 64 extending laterally from the lever 14. Screws 65 and 66, pivotally connect the clevis 60 to the ball bearing 61 in the identical manner in which the clevis 55 is pivotally connected to the ball bearing 52.

The upper end of a vertically extending arm 67 of the torque crank 49 is also provided with a ball bearing 68 to which is pivotally connected a clevis 69 in the same manner as the clevis 55 to the ball bearing 52 in the outer end of the horizontal arm. The clevis 69 is connected to a clevis 70 by means of a rod 71. The clevis 70 engages a ball bearing 72 in the end of a torque arm 73 whose other end is circumjacently mounted on the vertical shaft 36 and locked thereto by means of a set screw 74. A similar arm 75 is similarly secured to the shaft 36 below and in spaced relation to the arm 73 and provided in its outer end with a ball bearing 76. The vertically extending arm 67 of the crank 49 has also staked therein in spaced relation to the bearing 68 a ball bearing 77, the distance between the center lines of the torque arms 73 and 75 are the same as the distance between the bearings 68 and 77 so that the connecting rod 71 with its clevises 69 and 70 may be connected to these members for a reason which will later be explained.

The ends of the arms 50 and 67 of the crank 49 are connected by an arm 78 which is bifurcated so that the rod 71, when in the lower position, will not interfere with the action of the crank.

A third torque arm 79 is clamped to the vertical shaft 36 below the torque arm 75 and extending upwardly through its free end is a screw 80 having a shouldered tenon 81. The shoulder of the screw, as well as the tenon 81 are hardened and ground and pivotally engage one end of a light link 82 whose other end pivotally engages an arm 83 of a straight line motion linkage adapted to actuate a recording stylus 84 which is pivoted upon a pintle 85 between two ears 86 formed upwardly on the arm 83 (Figures III and V). The stylus comprises a light fulcrum frame 87 which supports the pintle 85. A small screw 88 is clamped rearwardly to the frame 87 upon which small counterbalance weights 88a are adjustably seated. The forward end of the frame 87 clampingly engages a small aluminum tube 89 in the free end of which a small downwardly pointed glass capillary tube 90 is fixed while to its rear end a small downwardly bent tube 91 is secured which dips into a supply of ink in a small receptacle 92 fixed in the forward end of the arm 83. Since the bores of the glass tubes 90 and 91 are of capillary dimensions the ink in the receptacle 92 is fed to the writing tip of the tube 90 by capillary action.

The arm 83 of the straight line motion linkage is pivoted upon a tenon stud in the center of a short link 93 whose ends pivotally engage ends of links 94 and 95; the opposite ends of these links, by means of hardened tenon studs 96 and 97 respectively, pivotally engage a steel plate 98 into which posts 99 are studded, their lower ends being locked to the upper face of the base 10 by means of nuts 100. To support one end of another link 105, two plates 101 and 102, are fastened to the plate 98. These extend forwardly, their free ends being secured respectively to the top and bottom of a spacer 103. A portion of this spacer, which is of steel, extends upwardly through the plate 101 and forms a seat for a tenon in a stud 104 which is fixed to one end of the link 105 whose other end, by means of a tenon stud 106, is pivotally connected to the arm 83. The link 105 is bent so as to clear the receptacle 92 in the arm 83 and a similar bend is provided in the plate 101 for clearance of the bent portion of the link 105. The plates 101 and 102, with the spacer 103, form a light stiff frame which may however be replaced by a single plate of suitable stiffness if so desired. The operation of straight line motion linkages is so well understood that a description of its operation is deemed unnecessary.

Mounted centrally upon the plate 31, in a vertical plane which passes through the writing tip 90 of the stylus 84 and secured to the plate 31 by means of the screws 110 is a frame 107 on which is mounted a drum 108 which supports a sheet of graph paper, and a clockwork 109 for revolving the drum 108. This recording mechanism may be of any kind and construction and, therefore, it is not described herein in greater detail.

The bracket 32, which is secured by means of bolts 32' to the plate 31 on its rear, is provided with machined ways 111 in which a bracket 112 is adjustably seated and adapted to be locked into position by a bolt and thumbnut 113. Suitable means (not shown) are provided on this bracket for supporting a small synchronous motor 114 which is preferably equipped with an inbuilt speed reducing gearing 115. To the extending portion of the shaft of the speed reducer is fixed a small bevel pinion 116 whose teeth engage the teeth of a bevel pinion 117, fixed to a short shaft 118 extending at an angle of 90° through a boss on a shelf 119 extending forwardly from the bracket 112. The lower end of the shaft 118 is provided with a threaded stud which is screwed into an agitator 120 having curved fingers 121 which are adapted to project into the specimen receptacle 41.

The threaded member 42 is provided with a series of fingers 122 which are spaced so that they miss the curved fingers 121 of the agitator 120 when this agitator is rotating, there being sufficient clearance between these fingers so that portions of the dough specimen in the receptacle will be thoroughly mixed. The bracket 112 which supports the motor 114 and the agitator means is adjustably mounted on the bracket 32 so that the agitator may be withdrawn from the receptacle and it as well as the receptacle disassembled for cleaning and charging.

In baking bread the quality of the dough depends upon its ability to form cells bounded by thin membranes of dough under the action of the carbon dioxide formed during fermentation of the yeast or other ferment and upon the extent that these membranes are able to stretch without breakage, that is upon their coefficient of distention. Different types of wheat produce flours which have different coefficients of distention, that is different tenacities.

So that dough specimens made from flours having high or low coefficients of distention tenacities may be tested in a single device, a graduated beam 123 is secured to short forwardly extending arms 124 and 125 of the lever 14 by means of countersunk head screws 126. This beam is marked with two series of graduations having a common zero point. One of these series, extending to the right of the fulcrum pivot, has a "plus" value and the one extending towards the left has a "minus" value. Furthermore each of these two series is provided with two series of indicia, one ranging from zero to 1000 grams and the other from zero to 2000 grams (depending upon the position of the connecting rod 71). A poise 127 is slidably mounted upon this beam, the normal position of its index 128 being in coincidence with the zero graduation at which point the poise has no effect upon the mechanism.

The operation of the device is as follows:

A definite amount of flour and a definite amount of water is placed in the specimen receptacle 41 and the motor 114 is energized. This motor, through the pinions 116 and 117, rotates the agitator 120 mixing the flour and water to form a dough. This mixing results in that every particle of the gluten forming ingredients of the flour is hydrated resulting in the formation of gluten which gives a certain tenacity to the dough. This tenacity causes the dough to have reactive influence between the fingers 121 and 122 in the receptacle and on the agitator respectively thus setting up a torque in the vertical shaft 36 which is transmitted, in this example, through the torque arm 73, the connecting rod 71 to the torque crank 49. This starts to rotate in a clockwise direction and through the connecting rod 59 exerts a downward force upon the lever 14, transmitting this force through the stirrup 16 and the pivot 17 to the pendulum 18 whose weight 25 moves outwardly and upwardly until its moment counterbalances the torque. The indicator 26 being directly connected to the pendulum 18 partakes of its movement and its index 27 moves away from its zero or null position and comes to rest, when the pendulum moment balances the torque, at that indicium in the series of indicia 28 which represents the numerical value of such torque. The torque arm 79, which, as previously explained, is also locked on the vertical shaft 36, transmits its movement through the link 82 to the link 83 upon which the stylus 84 is pivoted and this stylus scribes the movement of the torque arm upon the graph paper on the recording cylinder 108 whose driving means was started simultaneously with the starting of the motor 114 thus tracing a curve which graphically represents the various changes in the tenacity of the dough and the amount of time required to obtain these different tenacities. Should the gluten forming qualities of the flour be such that when the connecting rod 71 is connected to the torque arm 73 and to the upper ball bearing 68 in the torque crank that the reaction of the dough on the fingers 121 and 122 produces a torque so that the index 27 of the indicator 26 moves beyond the 2000 gram graduation in the series 28 on the chart 30 the poise 127 is moved away from its zero position towards the right, that is towards the "plus" side. This disturbs the equilibrium of the lever 14 and counterbalances a certain portion of the downward force transmitted from the torque crank 49 through the connecting rod 59 causing the pendulum ball to descend and moving the index 27 towards the center of the chart. If it is found that a number of tests will be conducted with dough made from flour giving a very high tenacity then the poise 127 is again moved to its null position and the connecting rod 71 is connected to the torque arm 75 and the ball bearing 77 in the torque crank resulting, because of the shorter distance between the fulcrum of this torque crank and the ball bearing 77, in a shorter power arm thus reducing the downward force transmitted through the connecting rod 59 to the lever and increasing the counterbalancing capacity of the pendulum at which time the index 27 of the indicator 26 cooperates with the lower series of graduation 29 on the chart 30. Infrequently it will become necessary to again offset a portion of the torque when the connecting rod is attached to the torque arm 75 and to the ball bearing 77 in the torque crank. This is accomplished by again moving the poise on the beam in the same manner but the value is now indicated by the lower series of value indicia which ranges from zero to 2000 grams.

Occasionally it will be required to test a material having little viscosity or tenacity and thus cause very little torque. This results in that the graph is objectionally near the opposite edge of the record on the cylinder 108. By moving the poise 127 away from its zero position on the "minus" side on the beam additional torque is created which results in that the pendulum moves upwardly an additional amount and the stylus 84, through the means described, will move toward the center of the record. It should also be obvious that the device may be employed for determining characteristics of other plastic material besides flour dough, for example, it may be employed to determine the viscosity, consistency or plasticity of natural or synthetic molding mixtures when in a plasticized state or of rubber doughs. Any of the well known methods of heating or cooling the material receptacle 41 may be employed as required.

The embodiment of the invention herein shown and described is to be regarded as illustrative only, and it is to be understood that the invention is susceptible to variation, modification and change within the spirit and scope of the subjoined claims.

Having described the invention, I claim:

1. In a device for testing plastic material, in combination, a support, torque counterbalancing mechanism mounted upon said support, torque indicating means actuated by said torque counterbalancing mechanism, a lever rockably mounted upon said support, a vertically positioned shaft mounted on said support, means acting upon the upper end of said vertically positioned shaft for imparting torque to said vertically positioned shaft in amounts depending upon a physical characteristic of such plastic material being tested, a bell crank lever pivotally mounted upon said support, a link pivotally connecting said vertically positioned shaft and one arm of said bell crank lever; a link pivotally connecting the other arm of said bell crank lever and said rockably mounted lever; and a link connecting said rockably mounted lever and said torque counterbalancing means for transmitting such torque to said torque counterbalancing means for measuring and indicating the amount thereof.

2. In a device for testing plastic material, in combination, a support, torque counterbalancing mechanism mounted upon said support, torque indicating means actuated by said torque counterbalancing mechanism, a lever rockably mounted upon said support, a vertically positioned shaft mounted upon said support, a receptacle secured to the upper end of said vertically positioned shaft for the reception of plastic material to be tested, means acting through such plastic material for imparting torque to said vertically positioned shaft in amounts depending upon a physical characteristic of such plastic material being tested, a bell crank lever pivotally mounted upon said support, a link pivotally connecting said vertically positioned shaft and one arm of said bell crank lever, a link pivotally connecting the other arm of said bell crank lever and said rockably mounted lever; a link connecting said rockably mounted lever and said torque counterbalancing means for transmitting such torque to said torque counterbalancing means for measuring and indicating the amount thereof, a beam secured to said rockably mounted lever and a poise slidably mounted upon said beam for modifying the effect of such torque on said torque counterbalancing mechanism.

3. In a testing device, in combination, a support, torque counterbalancing mechanism mounted upon said support, torque indicating means actuated by said torque counterbalancing mechanism, said torque indicating means including a chart bearing two series of indicia having a common zero point but the value of one of said series of indicia being a multiple of said other series, an indicator actuated by said torque counterbalancing means and having an index adapted to cooperate with both of said series of indicia, a vertically positioned shaft mounted upon said support, a receptacle secured to the upper end of said vertically positioned shaft for the reception of plastic material to be tested, means acting through said plastic material being tested for imparting variable amounts of torque to said vertically positioned shaft; such amounts depending upon a physical characteristic of such plastic material subject to change while being tested, a bell crank lever pivotally mounted upon said support and a lever rockably mounted upon said support, a link pivotally connecting said vertically positioned shaft and one arm of said bell crank lever, a link pivotally connecting the other arm of said bell crank lever and said rockably mounted lever and a link pivotally connecting said rockably mounted lever and said torque counterbalancing means for continuously measuring and indicating the varying amounts of such torque, said link pivotally connecting said vertically positioned shaft and the one arm of said bell crank lever being adapted to engage that arm of said bell crank lever in more than one position, said position being dependent upon the physical characteristic of said plastic material being tested, and one of said series cooperating to indicate the amount of torque when said link connecting said vertically positioned shaft and said bell crank lever is in one position and the other of said series of indicia on said chart cooperating to indicate the amount of torque when said link connecting said vertically positioned shaft and said bell crank lever is in another position

HALVOR O. HEM.